United States Patent
Mellet et al.

(10) Patent No.: US 8,733,194 B2
(45) Date of Patent: *May 27, 2014

(54) DUAL CLUTCH MULTI-SPEED TRANSMISSION

(75) Inventors: Edward W. Mellet, Rochester Hills, MI (US); Craig S. Ross, Ypsilanti, MI (US); Scott H. Wittkopp, Ypsilanti, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 470 days.

This patent is subject to a terminal disclaimer.

(21) Appl. No.: 13/095,582

(22) Filed: Apr. 27, 2011

(65) Prior Publication Data

US 2012/0272760 A1 Nov. 1, 2012

(51) Int. Cl.
*F16H 3/093* (2006.01)

(52) U.S. Cl.
USPC .......................................................... 74/331

(58) Field of Classification Search
CPC ............ F16H 3/006; F16H 2003/0931; F16H 2200/0056; F16H 3/093; F16H 2200/0065; F16H 3/089; F16H 3/0915
USPC .............................. 74/330, 331, 340, 325, 339
See application file for complete search history.

(56) References Cited

U.S. PATENT DOCUMENTS

| | | | |
|---|---|---|---|
| 7,080,566 B2 * | 7/2006 | Baldwin et al. | 74/331 |
| 7,437,963 B2 * | 10/2008 | Haka et al. | 74/329 |
| 7,470,206 B2 * | 12/2008 | Rodgers, II | 475/218 |
| 7,621,195 B2 * | 11/2009 | Hattori | 74/331 |
| 8,424,404 B2 * | 4/2013 | Ross et al. | 74/340 |
| 8,438,741 B2 * | 5/2013 | Kuehne et al. | 30/392 |
| 8,534,150 B2 * | 9/2013 | Mellet et al. | 74/331 |
| 2007/0199393 A1 | 8/2007 | Hattori | |
| 2008/0098838 A1 * | 5/2008 | Seo | 74/340 |
| 2008/0202268 A1 * | 8/2008 | Carey et al. | 74/331 |
| 2009/0173175 A1 * | 7/2009 | Thery | 74/331 |

* cited by examiner

*Primary Examiner* — Troy Chambers
*Assistant Examiner* — Jude Agendia (57) ABSTRACT

A transmission includes a transmission housing, a dual clutch assembly, a first through seven gear sets, a first transmission input shaft member rotatably supported in the transmission housing, a second transmission input shaft member rotatably supported in the transmission housing, a first countershaft rotatably supported within the transmission housing and spaced apart from and parallel with the first and second transmission input shaft members, a second countershaft rotatably supported within the transmission housing and spaced apart from and parallel with the first and second transmission input shaft members and five synchronizer assemblies each for selectively coupling at least one of the gears of the gear sets with at least one of the first countershaft and the second countershaft. The dual clutch assembly and the synchronizer assemblies are operable to achieve at least eight forward speed ratios and a reverse speed ratio between an input member and output member.

33 Claims, 2 Drawing Sheets

DUAL CLUTCH MULTI-SPEED TRANSMISSION

TECHNICAL FIELD

The present disclosure relates to transmissions and more particularly to a compact, dual clutch transmission having three axes to establish at least eight gear speeds and a reverse gear speed.

BACKGROUND

The statements in this section merely provide background information related to the present disclosure and may or may not constitute prior art.

A typical multiple speed transmission having countershafts and co-planar gear sets uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

The present invention provides a transmission having a transmission housing, a dual clutch assembly having a clutch housing connectable to a flywheel of an engine, a first, second, third, fourth, fifth, sixth, and seventh gear sets, a first transmission input shaft member rotatably supported in the transmission housing, a second transmission input shaft member rotatably supported in the transmission housing, a first countershaft rotatably supported within the transmission housing and spaced apart from and parallel with the first and second transmission input shaft members, a second countershaft rotatably supported within the transmission housing and spaced apart from and parallel with the first and second transmission input shaft members, and five synchronizer assemblies each for selectively coupling at least one of the gears of the first, second, third, fourth, and fifth gear sets with at least one of the first countershaft and the second countershaft. The clutch housing is rotationally supported within the transmission housing. Each of the gear sets include a first gear in mesh with a second gear. The first gear of the first gear set is rotatably fixed for common rotation with the first transmission input shaft member. The first gear of the second gear set is rotatably fixed for common rotation with the second transmission input shaft member and wherein the second transmission input shaft member is concentric with the first transmission input shaft member and at least partially surrounds the first transmission input shaft member. The second gears of the third, sixth and seventh gear sets are selectively connectable for common rotation with the first countershaft. Each of the second gears of the fourth and fifth gear sets are selectively connectable for common rotation with the second countershaft. The selective engagement of the dual clutch assembly interconnects the dual clutch housing with at least one of the first and the second transmission input shaft members and the selective engagement of at least one of the five synchronizer assemblies establishes at least one of five forward speed ratios. The first gear of the second gear set is rotatably fixed for common rotation with at least one of the first and second transmission input shaft members In one example of the present invention, the sixth gear set further includes a third gear meshing with the first gear of the sixth gear set, the third gear is selectively connectable for common rotation with the second countershaft.

In another example of the present invention, a first of the five synchronizer assemblies selectively connects the second gear of the third gear set to the first countershaft.

In yet another example of the present invention, a second of the five synchronizer assemblies selectively connects the second gear of the sixth and seventh gear sets to the first countershaft.

In yet another example of the present invention, a third of the five synchronizer assemblies selectively connects the second gear of the fourth gear set to the second countershaft.

In yet another example of the present invention, the first gear set is adjacent the dual clutch assembly, the second gear set is adjacent the first gear set, the third gear set is adjacent the second gear set, the fourth gear set is adjacent the third gear set, the fifth gear set is adjacent the fourth gear set, the sixth gear set is adjacent the fifth gear set, and the seventh gear set is between an end wall of the transmission housing and the sixth gear set.

In yet another example of the present invention, the first gear set further includes a third gear in mesh with the second gear of the first gear set.

In yet another example of the present invention, the third of the five synchronizer assemblies further selectively connects the third gear of the first gear set to the second countershaft.

In yet another example of the present invention, the fourth of the five synchronizer assemblies selectively connects the second gear of the first and second gear sets to the first countershaft.

In yet another example of the present invention, the fifth of the five synchronizer assemblies selectively connects the second gear of the fifth gear set and the third gear of the sixth gear set to the second countershaft.

In yet another example of the present invention, the first gear of the second gear set is rotatably fixed for common rotation with the second transmission input shaft member, the second gear of the first gear set is rotatably fixed to the first countershaft, the second gear of the second gear set is rotatably fixed to the second countershaft, the third, fourth, fifth and seventh gear sets further include a third gear, the third gear of the third gear set is in mesh with the first gear and the second gear of the third gear set, the third gear of the fourth and fifth gear sets are selectively connectable for common rotation with the first countershaft, and the third gear of the seventh gear set is selectively connectable for common rotation with the second countershaft.

In yet another example of the present invention, the transmission further includes an output member axially aligned with the first and second transmission input shafts, wherein the first gear of the third, fourth, fifth, sixth and seventh gear sets are rotatably fixed to the output member.

In yet another example of the present invention, the third of the five synchronizer assemblies further selectively connects the second gear of the fifth gear set to the second countershaft.

In yet another example of the present invention, the fourth of the five synchronizer assemblies selectively connects the third gear of the fourth and fifth gear sets to the first countershaft.

In yet another example of the present invention, the fifth of the five synchronizer assemblies selectively connects the third gear of the sixth and seventh gear sets to the second countershaft.

In yet another example of the present invention, the third gear set provides a reverse speed ratio, the fourth gear set provides a first and a second forward speed ratios, the fifth gear set provides a third and a fourth speed ratios, the sixth gear set provides a seventh and an eighth forward speed ratios, and the seventh gear set provides a fifth and a sixth forward speed ratio.

In yet another example of the present invention, the first gear set provides a second forward speed ratio and a reverse speed ratio, the second gear set provides a sixth forward speed ratio, the third gear set provides a fourth speed ratio, the fourth gear set provides an eighth forward speed ratio, the fifth gear set provides a seventh forward speed ratio, the sixth gear set provides a third forward speed ratio, and the seventh gear set provides a first forward speed ratio.

In yet another example of the present invention, the transmission further includes a first transfer gear, second transfer gear and an output gear, wherein the first transfer gear is rotatably fixed to the first countershaft, the second transfer gear is rotatably fixed to the second countershaft and each transfer gear is in mesh with the output gear.

The above features and advantages and other features and advantages of the present invention are readily apparent from the following detailed description of the best modes for carrying out the invention when taken in connection with the accompanying drawings.

DESCRIPTION

Figure 1:
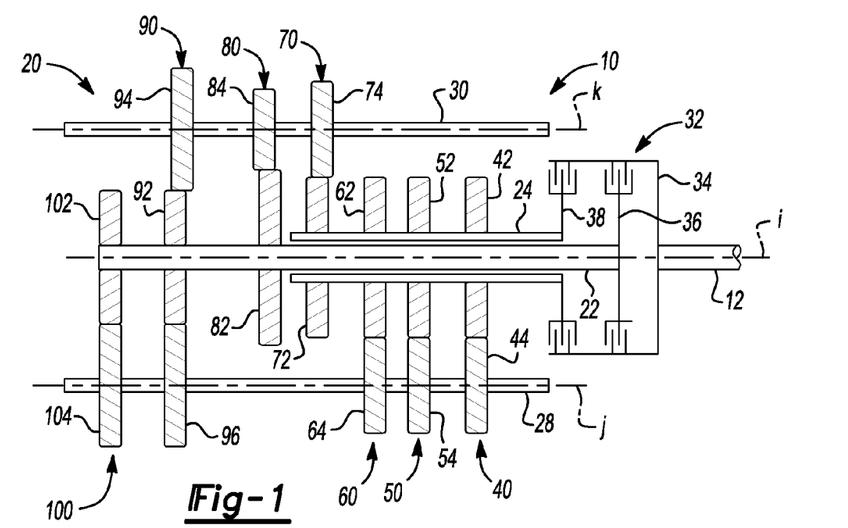
FIG. 1 is a schematic diagram of an example of an eight speed transmission, in accordance with the present invention.

Referring to FIG. 1, a multiple speed transmission is generally indicated by reference number 10. The transmission 10 includes an input member 12, an output member 14 and a gearing arrangement 20. The input member 12 may be separate from the transmission 10 and form part of or be connected with a flywheel or other output from an engine (not shown). The gearing arrangement 20 includes various shafts or members, co-planar intermeshing gear sets, a dual clutch assembly, and selectively engageable synchronizers, as will be described herein. For example, the gearing arrangement 20 includes a first transmission input shaft 22, a second transmission input shaft 24, a first countershaft 28 and a second countershaft 30. The second transmission input shaft 24 is a sleeve shaft that is concentric with and overlies the first transmission input shaft 22. The first and second countershafts 28, 30 are spaced apart from and parallel with the first and second transmission input shafts 22, 24. Moreover, the first and second countershafts 28, 30 are connectable through additional gears and/or shafts (not shown) to a final drive assembly (not shown) that is configured to drive a pair of road wheels (not shown). The first and second transmission input shafts 22, 24 define a first axis of rotation i, the first countershaft 28 defines a second axis of rotation j and the second countershaft 30 defines a third axis of rotation k.

A dual clutch assembly 32 is connectable between the input member 12 and the first and second transmission input shafts 22, 24. The dual clutch assembly 32 includes a clutch housing 34 connectable for common rotation with the input member 12. The dual clutch assembly 32 could be either a dry or a wet clutch assembly. Further, the dual clutch assembly 32 has first and second clutch elements or hubs 36 and 38. Clutch elements 36 and 38 together with the clutch housing 34 are configured to form a friction clutch, as is known in the art as a dual clutch. More specifically, clutch elements 36, 38 and the clutch housing 34 have friction plates mounted thereon, or are otherwise coupled thereto, that interact to form a friction clutch. The clutch element 36 is connected for common rotation with the first transmission input shaft 22 and the clutch element 38 is connected for common rotation with the second transmission input shaft 24. Thus, selective engagement of clutch element 36 with the clutch housing 34 connects the input member 12 for common rotation with the first transmission input shaft 22. Selective engagement of clutch element 38 with the clutch housing 34 connects the input member 12 for common rotation with the second transmission input shaft 24.

Figure 2:
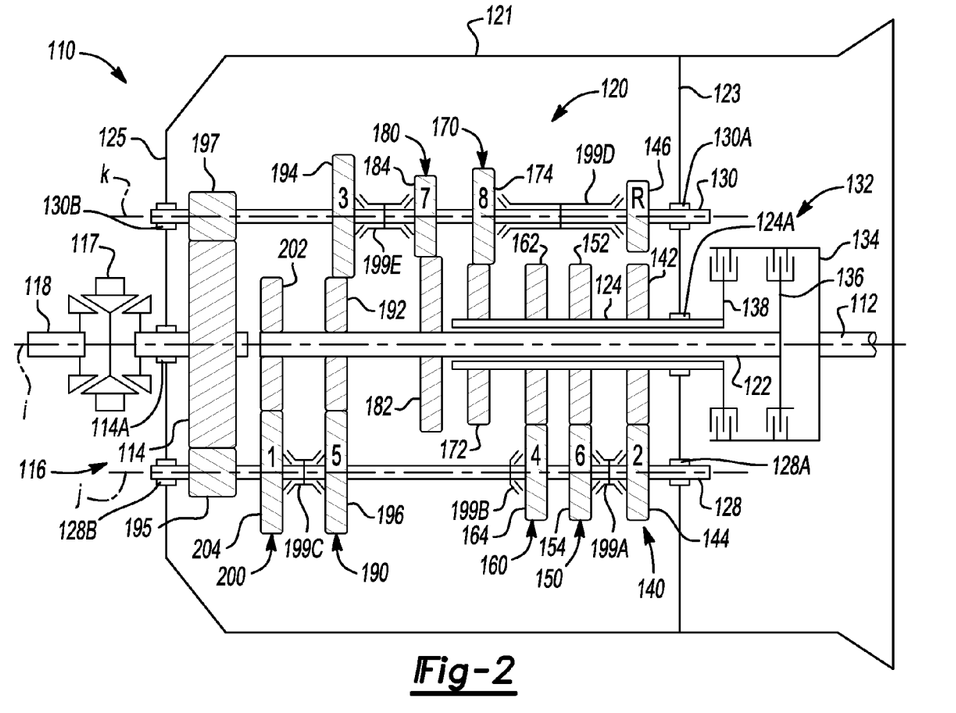
FIG. 2 is a schematic diagram of an example of an eight speed transmission, plus one reverse speed, illustrating synchronizer locations, in accordance with the present invention.

The gearing arrangement 20 also includes a plurality of co-planar, intermeshing gear sets 40, 50, 60, 70, 80, 90, and 100. Co-planar gear sets 40, 50, 60, 70, 80, and 100 include intermeshing gear pairs: gear 42 and gear 44, gear 52 and gear 54, gear 62 and gear 64, gear 72 and gear 74, gear 82 and gear 84, and gear 102 and gear 104, respectively. Co-planar gear set 90 includes three intermeshing gears: gear 92, gear 94, and gear 96. In an example of the present invention, gears 42, 52, 62 and 72 are rotatably fixed for common rotation with the second transmission input shaft 24. Gears 82, 92, and 102 are rotatably fixed for common rotation with the first transmission input shaft 22. Gears 74, 84, and 94 are selectively connectable for common rotation with the second countershaft 30. Further, gears 44, 54, 64, 96, and 104 are selectively connectable for common rotation with the first countershaft 28. The individual gears of co-planar gear sets 40, 50, 60, 70, 80, 90, and 100 are independently and selectively connectable for common rotation with the first countershaft 28 or second countershaft 30 by synchronizer assemblies, as shown in FIG. 2 and as will be further described hereinafter. Of course, the present invention contemplates other selectively actuatable devices other than synchronizers for connecting gears to shafts.

Referring now to FIG. 2, another example of a multiple speed transmission is generally indicated by reference number 110. The transmission 110 includes an input member 112 and an output gear or member 114. The input member 112 is continuously connected with an engine (not shown) or other torque producing machine to provide a driving torque to input member 112. The output member 114 rotatably drives a final drive assembly 116. More specifically, the final drive assembly 116 includes a differential gear set coupled to and supported in a differential housing 117. A differential housing 117 is coupled to and is rotatably driven by output member 114. Further, the differential housing 117 transfers torque delivered by output member 114 to the differential gear set that is rotatably coupled to an axle 118, and on to road wheels (not shown) coupled to axel 118.

The transmission 110 includes a gearing arrangement 120 that is at least partially enclosed by a housing 121. The housing 121 includes end walls 123 and 125. End wall 123 is located on a front or side of the transmission 110 proximate a dual clutch assembly 132 and end wall 125 is located on an opposite side of the transmission housing 121 than end wall 123. As in the example described above, the gearing arrangement 120 of transmission 110 includes a first transmission input shaft 122, a second transmission input shaft 124, a first countershaft 128 and a second countershaft 130. The second transmission input shaft 124 is a sleeve shaft that is concentric with and overlies the first transmission input shaft 122. The first and second countershafts 128, 130 are each spaced apart from and parallel with the first and second transmission input shafts 122,124. The first and second transmission input shafts 122,124 define a first axis of rotation i, the first countershaft 128 defines a second axis of rotation j, and the second countershaft 130 defines a third axis of rotation k.

The transmission input shafts 122, 124, countershafts 128, 130, and output member 114 are rotatably supported in the housing 121 through a plurality of bearings. For example, the second transmission input shaft 124 is rotatably supported by the end wall 123 through bearing 124A. The first countershaft 128 is rotatably supported by the end wall 123 through bearing 128A and by the end wall 125 through bearing 128B. The second countershaft 130 is rotatably supported by the end wall 123 through bearing 130A and by the end wall 125 through bearing 130B. The output shaft 114 is rotatably supported by the end wall 125 through bearing 114A.

The dual clutch assembly 132 is connectable between the input member 112 and the first and second transmission input shafts 122, 124. The dual clutch assembly 132 includes a clutch housing 134 connectable for common rotation with the input member 112. Further, the dual clutch assembly 132 has first and second clutch elements or hubs 136 and 138. Clutch elements 136 and 138 together with the clutch housing 134 are configured to form a friction clutch, as is known in the art as a dual clutch. More specifically, clutch elements 136, 138 and the clutch housing 134 have friction plates mounted thereon, or are otherwise coupled thereto, that interact to form a friction clutch. The clutch element 136 is connected for common rotation with the first transmission input shaft 122 and the clutch element 138 is connected for common rotation with the second transmission input shaft 124. Thus, selective engagement of clutch element 136 with the clutch housing 134 connects the input member 112 for common rotation with the first transmission input shaft 122. Selective engagement of clutch element 138 with the clutch housing 134 connects the input member 112 for common rotation with the second transmission input shaft 124.

The gearing arrangement 120 also includes a plurality of co-planar, intermeshing gear sets 140, 150, 160, 170, 180, 190, and 200. Co-planar gear set 140 includes gear 142 and gear 144. Gear 142 is rotatably fixed and connected for common rotation with the second transmission input shaft 124 and intermeshes with gear 144. Gear 144 is selectively connectable for common rotation with the first countershaft member 128. Gear 146 is selectively connectable for common rotation with the second countershaft member 130 and intermeshes with gear 144. Gear set 140 is disposed adjacent the end wall 123.

Co-planar gear set 150 includes gear 152 and gear 154. Gear 152 is rotatably fixed and connected for common rotation with the second transmission input shaft 124 and intermeshes with gear 154. Gear 154 is selectively connectable for common rotation with the first countershaft 128. Gear set 150 is positioned adjacent gear set 140.

Co-planar gear set 160 includes gear 162 and gear 164. Gear 162 is rotatably fixed and connected for common rotation with the second transmission input shaft 124 and intermeshes with gear 164. Gear 164 is selectively connectable for common rotation with the first countershaft 128. Gear set 160 is disposed adjacent gear set 150.

Co-planar gear set 170 includes gear 172 and gear 174. Gear 172 is rotatably fixed and connected for common rotation with the second transmission input shaft 124 and intermeshes with gear 174. Gear 174 is selectively connectable for common rotation with the second countershaft member 130. Gear set 170 is located adjacent gear set 160.

Co-planar gear set 180 includes gear 182 and gear 184. Gear 182 is rotatably fixed and connected for common rotation with the first transmission input shaft 122 and intermeshes with gear 184. Gear 184 is selectively connectable for common rotation with the second countershaft 130. Gear set 180 is located adjacent gear set 170.

Co-planar gear set 190 includes gear 192, gear 194, and gear 196. Gear 192 is rotatably fixed and connected for common rotation with the first transmission input shaft 122 and intermeshes with gear 194 and gear 196. Gear 194 is selectively connectable for common rotation with the second countershaft 130. Gear 196 is selectively connectable for common rotation with the first countershaft 128. Gear set 190 is positioned adjacent gear set 180.

Co-planar gear set 200 includes gear 202 and gear 204. Gear 202 is rotatably fixed and connected for common rotation with the first transmission input shaft 122 and intermeshes with gear 204. Gear 204 is selectively connectable for common rotation with the first countershaft 128. Gear set 200 is located between gear set 190 and the end wall 125. It should be noted that gear sets 140, 150, 160, 170, 180, 190, and 200 can be rearranged in sequence and not deviate from the intent of the invention.

Further, a first countershaft transfer gear 195 is rotatably fixed and connected for common rotation with the first countershaft member 128. A second countershaft transfer gear 197 is rotatably fixed and connected for common rotation with the second countershaft member 130. The first countershaft transfer gear 195 and second countershaft transfer gear 197 is configured to mesh with output member 114. However, the first countershaft transfer gear 195 and the second countershaft transfer gear 197 do not mesh with each other. The first countershaft transfer gear 195 is disposed between gear 204 and end wall 125 of the transmission housing 121. The second countershaft transfer gear 197 is disposed between gear 194 and end wall 125 of the transmission housing 121. The output member 114 is co-planar with first and second countershaft transfer gears 195, 197 and positioned between the gear set 200 and end wall 125 of the transmission housing 121.

The transmission 110 further includes a plurality of selectively actuatable synchronizer assemblies 199A, 199B, 199C, 199D, and 199E. Synchronizer 199B is a single sided synchronizer that generally includes a shift fork (not shown) that is bi-directionally translated by an actuator (not shown) into either an engaged position or a neutral or disengaged position. In the present example, synchronizer 199B is selectively actuatable to connect gear 164 for common rotation with the first countershaft 128. Synchronizers 199A, 199C, 199D, and 199E are double sided synchronizers each of which generally include a shift fork (not shown) that is bi-directionally translated by an actuator (not shown) into at least two engaged positions and a neutral or disengaged position. In the present example, synchronizer 199A is selectively actuatable to connect for common rotation gear 144 with the first countershaft 128 and is selectively actuatable to connect for common rotation gear 154 with the first countershaft 128. Synchronizer 199C is selectively actuatable to connect for common rotation gear 196 with the first countershaft 128 and is selectively actuatable to connect for common rotation gear 204 with the first countershaft 128. Synchronizer 199D is selectively actuatable to connect for common rotation gear 146 with the second countershaft 130 and is selectively actuatable to connect for common rotation gear 174 with the second countershaft 130. Synchronizer 199E is selectively actuatable to connect for common rotation gear 184 with the second countershaft 130 and is selectively actuatable to connect for common rotation gear 194 with the second countershaft 130.

The transmission 110 is capable of transmitting torque from the input shaft member 112 to the output member 114 in at least eight forward torque ratios and at least one reverse torque ratio. Each of the forward torque ratios and the reverse torque ratio is attained by selective engagement of the dual clutch assembly 132 and one or more of the synchronizer assemblies 199A-E. Those skilled in the art will readily understand that a different speed ratio is associated with each torque ratio.

It should be appreciated that each individual gear set 140, 150, 160, 170, 180, 190 and 200 provides one or more forward and/or reverse gear ratios upon selective engagement of the synchronizer assemblies 199A-E. However, which synchronizer and which gear set are associated with a particular forward or reverse speed ratio may vary without departing from the scope of the present invention.

For example, to establish the reverse torque ratio, clutch element 138 is engaged to couple the input member 112 with the second transmission input shaft 124 and synchronizer 199D is engaged to connect gear 146 to the second countershaft 130. More specifically, input torque from the input shaft member 112 is transferred through the dual clutch assembly 132 to the second transmission input shaft 124, through gear 142 to gear 144, through gear 144 to gear 146, from gear 146 to synchronizer 199D, from synchronizer 199D to second countershaft 130, from second countershaft 130 to transfer gear 197, from transfer gear 197 to output gear 114 and from output gear 114 to differential housing 117 of final drive assembly 116.

To establish a first forward torque ratio (i.e. a 1st gear), clutch element 136 is engaged to couple the input member 112 with the first transmission input shaft 122 and synchronizer 199C is activated to couple gear 204 to the first countershaft 128. More specifically, input torque from the input member 112 is transferred through the dual clutch assembly 132 to the first transmission input shaft 122 to gear 202. Gear 202 transfers torque to gear 204 which transfers the torque to the first countershaft 128 through synchronizer 199C, from the first countershaft 128 to transfer gear 195, from transfer gear 195 to output gear 114, and from output gear 114 to differential housing 117 of final drive assembly 116.

To establish a second forward torque ratio (i.e. a 2nd gear), clutch element 138 is engaged to couple the input member 112 to the second transmission input shaft 124 which rotates gear 142 and synchronizer 199A is activated to couple gear 144 to the first countershaft member 128. Accordingly, input torque from the input member 112 is transferred through the dual clutch assembly 132 to the second transmission input shaft 124 to gear 142. Gear 142 transfers torque to gear 144 which transfers the torque to the first countershaft 128 through synchronizer 199A, from the first countershaft 128 to transfer gear 195, from transfer gear 195 to output gear 114 and from output gear 114 to differential housing 117 of final drive assembly 116.

To establish a third forward torque ratio (i.e. a 3rd gear), clutch element 136 is engaged to couple the input member 112 to the first transmission input shaft 122 which rotates gear 192 and synchronizer 199E is engaged to couple gear 194 to the second countershaft 130. Accordingly, input torque from the input member 112 is transferred through the dual clutch assembly 132 to the first transmission input shaft 122 to gear 192. Gear 192 transfers torque to gear 194 which transfers the torque to the second countershaft 130 through synchronizer 199E, from the second countershaft 130 to transfer gear 197, from transfer gear 197 to output gear 114 and from output gear 114 to differential housing 117 of final drive assembly 116.

To establish a fourth forward torque ratio (i.e. a 4th gear), clutch element 138 is engaged to couple the input member 112 to the second transmission input shaft 124 which rotates gear 162 and synchronizer 199B is activated to couple gear 164 to the first countershaft 128. Thus, input torque from the input member 112 is transferred through the dual clutch assembly 132 to the second transmission input shaft 124 to gear 162. Gear 162 transfers torque to gear 164 which transfers the torque to the first countershaft 128 through synchronizer 199B, from the first countershaft 128 to transfer gear 195, from transfer gear 195 to output gear 114 and from output gear 114 to differential housing 117 of final drive assembly 116.

To establish a fifth forward torque ratio (i.e. a 5th gear), clutch element 136 is engaged to couple the input member 112 to the first transmission input shaft 122 which rotates gear 192 and synchronizer 199C is activated to couple gear 196 to the first countershaft 128. Thus, input torque from the input member 112 is transferred through the dual clutch assembly 132 to the first transmission input shaft 122 to gear 192. Gear 192 transfers torque to gear 196 which transfers the torque to the first countershaft 128 through synchronizer 199C, from the first countershaft 128 to transfer gear 195, from transfer gear 195 to output gear 114 and from output gear 114 to differential housing 117 of final drive assembly 116.

To establish a sixth forward torque ratio (i.e. a 6th gear), clutch element 138 is engaged to couple the input member 112 to the second transmission input shaft 124 which rotates gear 152 and synchronizer 199A is activated to couple gear 154 to the first countershaft 128. Thus, input torque from the input member 112 is transferred through the dual clutch assembly 132 to the second transmission input shaft 124 to gear 152. Gear 152 transfers torque to gear 154 which transfers the torque to the first countershaft 128 through synchronizer 199A, from the first countershaft 128 to transfer gear 195, from transfer gear 195 to output gear 114 and from output gear 114 to differential housing 117 of final drive assembly 116.

To establish a seventh forward torque ratio (i.e. a 7th gear), clutch element 136 is engaged to couple the input member 112 to the first transmission input shaft 122 which rotates gear 182 and synchronizer 199E is activated to couple gear 184 to the second countershaft 130. Thus, input torque from the input member 112 is transferred through the dual clutch assembly 132 to the first transmission input shaft 122 to gear 182. Gear 182 transfers torque to gear 184 which transfers the torque to the second countershaft 130 through synchronizer 199E, from the second countershaft 130 to transfer gear 197, from transfer gear 197 to output gear 114 and from output gear 114 to differential housing 117 of final drive assembly 116.

To establish a eighth forward torque ratio (i.e. a 8th gear), clutch element 138 is engaged to couple the input member 112 to the second transmission input shaft 124 which rotates gear 172 and synchronizer 199D is activated to couple gear 174 to the second countershaft 130. Thus, input torque from the input member 112 is transferred through the dual clutch assembly 132 to the second transmission input shaft 124 to gear 172. Gear 172 transfers torque to gear 174 which transfers the torque to the second countershaft 130 through synchronizer 199C, from the second countershaft 130 to transfer gear 197, from transfer gear 197 to output gear 114 and from output gear 114 to differential housing 117 of final drive assembly 116.

Again, it should be appreciated that any one of the gear sets 140, 150, 160, 170, 180, 190, and 200 may be changed to produce a certain forward and reverse torque ratio without departing from the scope of the present invention.

The present invention contemplates that a variety of torque ratios (i.e., the ratio of torque of the output member 114 to the input member 112) are achievable through the selection of tooth counts of the gears of the transmission 110. This arrangement provides the opportunity to achieve reduced transmission length in comparison with other transmissions.

Figure 3:
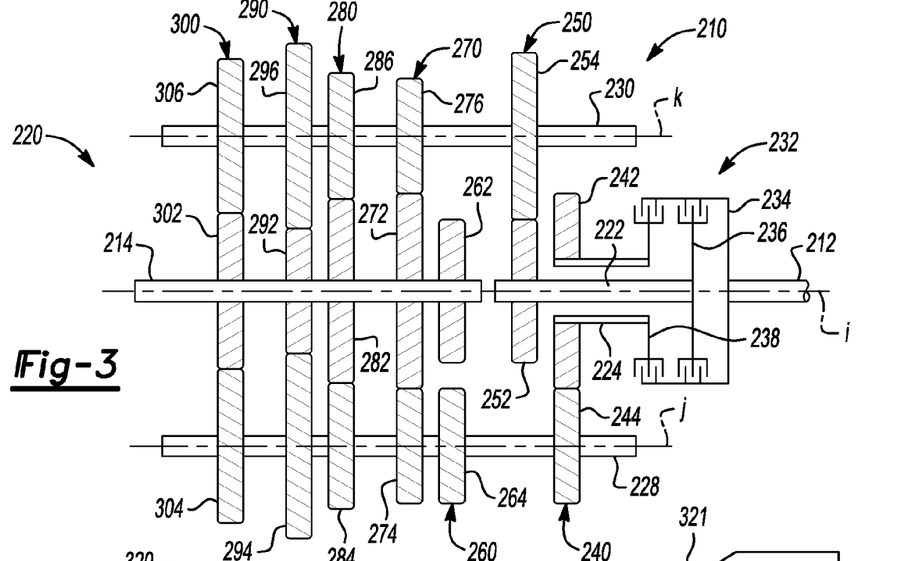
FIG. 3 is a schematic diagram of another example of an eight speed transmission, in accordance with the present invention.

Referring to FIG. 3, a multiple speed transmission is generally indicated by reference number 210. The transmission 210 includes an input member 212, an output member 214 and a gearing arrangement 220. The input member 212 may be separate from the transmission 210 and form part of or be connected with a flywheel or other output from an engine (not shown). The gearing arrangement 220 includes various shafts or members, co-planar intermeshing gear sets, a dual clutch assembly, and selectively engageable synchronizers, as will be described herein. For example, the gearing arrangement 220 includes the output member 214, a first transmission input shaft 222, a second transmission input shaft 224, a first countershaft 228, and a second countershaft 230. The second transmission input shaft 224 is a sleeve shaft that is concentric with and overlies the first transmission input shaft 222. The first and second countershafts 228, 230 are spaced apart from and parallel with the first and second transmission input shafts 222, 224. Moreover, the first and second countershafts 228, 230 are connectable through additional gears and/or shafts (not shown) to a final drive assembly (not shown) that is configured to drive a pair of road wheels (not shown). The first and second transmission input shafts 222, 224 and the output shaft 214 define a first axis of rotation i, the first countershaft 228 defines a second axis of rotation j and the second countershaft 230 defines a third axis of rotation k.

A dual clutch assembly 232 is connectable between the input member 212 and the first and second transmission input shafts 222, 224. The dual clutch assembly 232 includes a clutch housing 234 connectable for common rotation with the input member 212. The dual clutch assembly 232 could be either a dry or a wet clutch assembly. Further, the dual clutch assembly 232 has first and second clutch elements or hubs 236 and 238. Clutch elements 236 and 238 together with the clutch housing 234 are configured to form a friction clutch, as is known in the art as a dual clutch. More specifically, clutch elements 236, 238 and the clutch housing 234 have friction plates mounted thereon, or are otherwise coupled thereto, that interact to form a friction clutch. The clutch element 236 is connected for common rotation with the first transmission input shaft 222 and the clutch element 238 is connected for common rotation with the second transmission input shaft 224. Thus, selective engagement of clutch element 236 with the clutch housing 234 connects the input member 212 for common rotation with the first transmission input shaft 222. Selective engagement of clutch element 238 with the clutch housing 234 connects the input member 212 for common rotation with the second transmission input shaft 224.

The gearing arrangement 220 also includes a plurality of co-planar, intermeshing gear sets 240, 250, 260, 270, 280, 290, and 300. Co-planar gear sets 240, 250, and 260 include intermeshing gear pairs: gear 242 and gear 244, gear 252 and gear 254, gear 262 and gear 264. Co-planar gear sets 270, 280, 290, and 300 include three intermeshing gears: gear 272, gear 274, and gear 276, gear 282, gear 284, and gear 286, gear 292, gear 294, and gear 296, gear 302, gear 304, and gear 306, respectively. In an example of the present invention, gear 242 is rotatably fixed for common rotation with the second transmission input shaft 224. Gear 252 is rotatably fixed for common rotation with the first transmission input shaft 222. Gears 262, 272, 282, 292, and 302 are rotatably fixed for common rotation with the output shaft member 214. Gears 244, 264, 274, 284, 294, and 304 are selectively connectable for common rotation with the first countershaft 228. Gears 254, 276, 286, 296, and 306 are selectively connectable for common rotation with the second countershaft 230. The individual gears of co-planar gear sets 240, 250, 260, 270, 280, 290, and 300 are independently and selectively connectable for common rotation with the first countershaft 228 or second countershaft 230 by synchronizer assemblies, as will be further described hereinafter. Of course, the present invention contemplates other selectively actuatable devices other than synchronizers for connecting gears to shafts.

Figure 4:
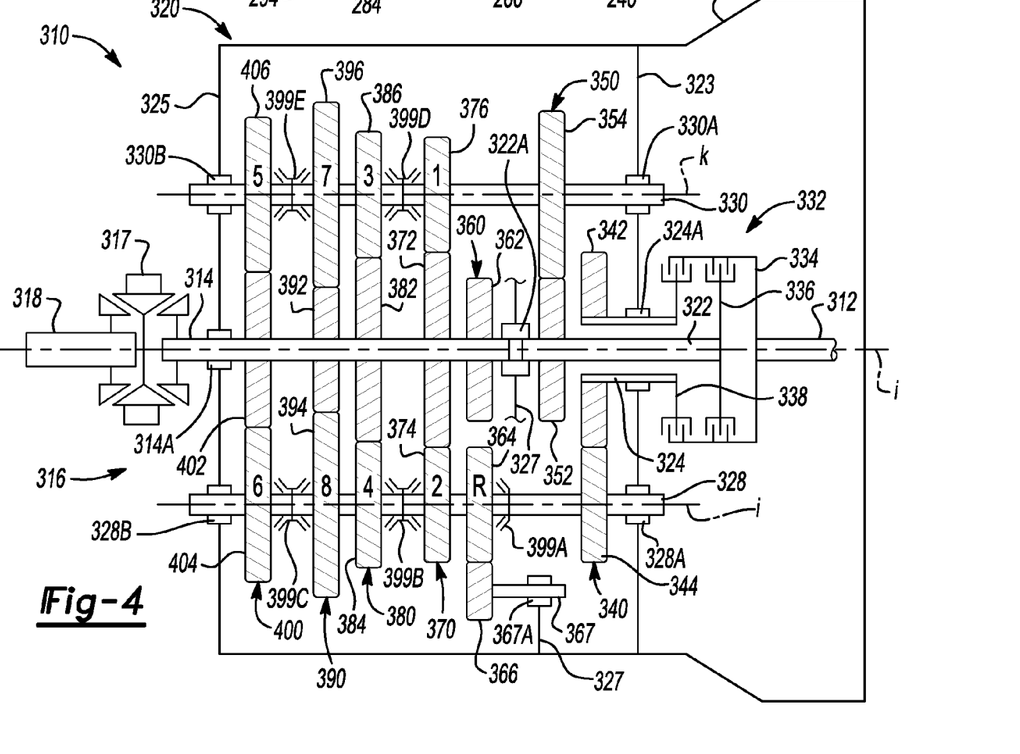
FIG. 4 is a schematic diagram of another example of an eight speed transmission, plus one reverse speed, illustrating synchronizer locations, in accordance with the present invention.

Referring now to FIG. 4, another example of a multiple speed transmission is generally indicated by reference number 310. The transmission 310 includes an input member 312 and an output shaft member 314. The input member 312 is continuously connected with an engine (not shown) or other torque producing machine to provide a driving torque to input member 312. The output shaft member 314 rotatably drives a final drive assembly 316. More specifically, the final drive assembly 316 includes a differential gear set coupled to and supported in a differential housing 317. A differential housing 317 is coupled to and is rotatably driven by output member 314. Further, the differential housing 317 transfers torque delivered by output member 314 to the differential gear set that is rotatably coupled to an axle 318, and on to road wheels (not shown) coupled to axel 318.

The transmission 310 includes a gearing arrangement 320 that is at least partially enclosed by a housing 321. The housing 321 includes end walls 323 and 325 and middle wall 327. End wall 323 is located on a front or side of the transmission 310 proximate a dual clutch assembly 332 and end wall 325 is located on an opposite side of the transmission housing 321 than end wall 323. As in the example described above, the gearing arrangement 320 of transmission 310 includes the output shaft member 314, a first transmission input shaft 322, a second transmission input shaft 324, a first countershaft 328 and a second countershaft 330. The second transmission input shaft 324 is a sleeve shaft that is concentric with and overlies the first transmission input shaft 322. The output shaft member 314 is coaxial with the first and second transmission input shafts 322, 324. The first and second countershafts 328, 330 are each spaced apart from and parallel with the first and second transmission input shafts 322, 324. The output shaft member 314 and first and second transmission input shafts 322, 324 define a first axis of rotation i, the first countershaft 328 defines a second axis of rotation j, and the second countershaft 330 defines a third axis of rotation k.

The transmission input shafts 322, 324, countershafts 328, 330, and output shaft 314 are rotatably supported in the housing 321 through a plurality of bearings. For example, the first transmission input shaft 322 is rotatably supported by the middle wall 327 of the housing through bearing 322A. The second transmission input shaft 324 is rotatably supported by the end wall 323 through bearing 324A. The first countershaft 328 is rotatably supported by the end wall 323 through bearing 328A and by the end wall 325 through bearing 328B. The second countershaft 330 is rotatably supported by the end wall 323 through bearing 330A and by the end wall 325 through bearing 330B. The output shaft 314 is rotatably supported by the middle wall 327 through bearing 322A and by the end wall 325 through bearing 314A. The shaft 367 is rotatably supported by middle wall 327 through bearing 367A.

The dual clutch assembly 332 is connectable between the input member 312 and the first and second transmission input shafts 322, 324. The dual clutch assembly 332 includes a clutch housing 334 connectable for common rotation with the input member 312. Further, the dual clutch assembly 332 has first and second clutch elements or hubs 336 and 338. Clutch elements 336 and 338 together with the clutch housing 334 are configured to form a friction clutch, as is known in the art as a dual clutch. More specifically, clutch elements 336, 338 and the clutch housing 334 have friction plates mounted thereon, or are otherwise coupled thereto, that interact to form a friction clutch. The clutch element 336 is connected for common rotation with the first transmission input shaft 322 and the clutch element 338 is connected for common rotation with the second transmission input shaft 324. Thus, selective engagement of clutch element 336 with the clutch housing 334 connects the input member 312 for common rotation with the first transmission input shaft 322. Selective engagement of clutch element 338 with the clutch housing 334 connects the input member 312 for common rotation with the second transmission input shaft 324.

The gearing arrangement 320 also includes a plurality of co-planar, intermeshing gear sets 340, 350, 360, 370, 380, 390, and 400. Co-planar gear set 340 includes gear 342 and gear 344. Gear 342 is rotatably fixed and connected for common rotation with the second transmission input shaft 324 and intermeshes with gear 344. Gear 344 is rotatably fixed and connected for common rotation with the first countershaft member 328. Gear set 340 is disposed adjacent the end wall 323.

Co-planar gear set 350 includes gear 352 and gear 354. Gear 352 is rotatably fixed and connected for common rotation with the first transmission input shaft 322 and intermeshes with gear 354. Gear 354 is rotatably fixed and connected for common rotation with the second countershaft 330. Gear set 350 is positioned adjacent gear set 340.

Co-planar gear set 360 includes gear 362, gear 364, and gear 366. Gear 362 is rotatably fixed and connected for common rotation with the output shaft member 314. Gear 364 is selectively connectable for common rotation with the first countershaft 328. Gear 366 is rotatably supported by a shaft 367 and intermeshes with both gear 362 and gear 364. However, gear 362 does not intermesh with gear 364. Gear set 360 is disposed adjacent gear set 350.

Co-planar gear set 370 includes gear 372, gear 374, and gear 376. Gear 372 is rotatably fixed and connected for common rotation with the output shaft member 314 and intermeshes with gear 374 and gear 376. Gear 374 is selectively connectable for common rotation with the first countershaft member 328. Gear 376 is selectively connectable for common rotation with the second countershaft member 330. Gear set 370 is located adjacent gear set 360.

Co-planar gear set 380 includes gear 382, gear 384, and gear 386. Gear 382 is rotatably fixed and connected for common rotation with the output shaft member 314 and intermeshes with gear 384 and gear 386. Gear 384 is selectively connectable for common rotation with the first countershaft 328. Gear 386 is selectively connectable for common rotation with the second countershaft 330. Gear set 380 is located adjacent gear set 370.

Co-planar gear set 390 includes gear 392, gear 394, and gear 396. Gear 392 is rotatably fixed and connected for common rotation with the output shaft member 314 and intermeshes with gear 394 and gear 396. Gear 394 is selectively connectable for common rotation with the first countershaft 328. Gear 396 is selectively connectable for common rotation with the second countershaft 330. Gear set 390 is positioned adjacent gear set 380.

Co-planar gear set 400 includes gear 402, gear 404, and gear 406. Gear 402 is rotatably fixed and connected for common rotation with the output shaft member 314 and intermeshes with gear 404 and gear 406. Gear 404 is selectively connectable for common rotation with the first countershaft 328. Gear 406 is selectively connectable for common rotation with the second countershaft 330. Gear set 400 is located between gear set 390 and the end wall 325. It should be noted that gear sets 340, 350, 360, 370, 380, 390, and 400 can be rearranged in sequence and not deviate from the intent of the invention.

The transmission 310 further includes a plurality of selectively actuatable synchronizer assemblies 399A, 399B, 399C, 399D, and 399E. Synchronizer 399A is a single sided synchronizer that generally includes a shift fork (not shown) that is bi-directionally translated by an actuator (not shown) into either an engaged position or a neutral or disengaged position. In the present example, synchronizer 399A is selectively actuatable to connect gear 364 for common rotation with the first countershaft 328. Synchronizers 399B, 399C, 399D, and 399E are double sided synchronizers each of which generally includes a shift fork (not shown) that is bi-directionally translated by an actuator (not shown) into at least two engaged positions and a neutral or disengaged position. In the present example, synchronizer 399A is selectively actuatable to connect for common rotation gear 364 with the first countershaft 328. Synchronizer 399B is selectively actuatable to connect for common rotation gear 374 with the first countershaft 328 and is selectively actuatable to connect for common rotation gear 384 with the first countershaft 328. Synchronizer 399C is selectively actuatable to connect for common rotation gear 394 with the first countershaft 328 and is selectively actuatable to connect for common rotation gear 404 with the first countershaft 328. Synchronizer 399D is selectively actuatable to connect for common rotation gear 376 with the second countershaft 330 and is selectively actuatable to connect for common rotation gear 386 with the second countershaft 330. Synchronizer 399E is selectively actuatable to connect for common rotation gear 396 with the second countershaft 330 and is selectively actuatable to connect for common rotation gear 406 with the second countershaft 330.

The transmission 310 is capable of transmitting torque from the input member 312 to the output shaft member 314 in at least eight forward torque ratios and at least one reverse torque ratio. Each of the forward torque ratios and the reverse torque ratio is attained by selective engagement of the dual clutch assembly 332 and one or more of the synchronizer assemblies 399A-E. Those skilled in the art will readily understand that a different speed ratio is associated with each torque ratio.

It should be appreciated that each individual gear set 340, 350, 360, 370, 380, 390 and 400 provides one or more forward and/or reverse gear ratios upon selective engagement of the synchronizer assemblies 399A-E. However, which synchronizer and which gear set are associated with a particular forward or reverse speed ratio may vary without departing from the scope of the present invention.

For example, to establish the reverse torque ratio, clutch element 338 is engaged to couple the input member 312 with the second transmission input shaft 324 and synchronizer 399A is engaged to connect gear 364 to the first countershaft 328. More specifically, input torque from the input member 312 is transferred through the dual clutch assembly 332 to the second transmission input shaft 324, through gear 342 to gear 344, through gear 344 to the first countershaft 328, from the first countershaft 328 to gear 364 through synchronizer 399A, from gear 364 to gear 366, from gear 366 to gear 362, from gear 362 to the output shaft member 314, and from output shaft member 314 to differential housing 317 of final drive assembly 316.

To establish a first forward torque ratio (i.e. a 1st gear), clutch element 336 is engaged to couple the input member 312 with the first transmission input shaft 322 and synchronizer 399D is activated to couple gear 376 to the second countershaft 330. More specifically, input torque from the input member 312 is transferred through the dual clutch assembly 332 to the first transmission input shaft 322 to gear 352. Gear 352 transfers torque to gear 354 which transfers the torque to the second countershaft 330, from second countershaft 330 to gear 376 through synchronizer 399D, from gear 376 to gear 372, and from gear 372 to the output shaft member 314, and from the output shaft member 314 to differential housing 317 of final drive assembly 316.

To establish a second forward torque ratio (i.e. a 2nd gear), clutch element 338 is engaged to couple the input member 312 with the first transmission input shaft 324 and synchronizer 399B is activated to couple gear 374 to the first countershaft 328. More specifically, input torque from the input member 312 is transferred through the dual clutch assembly 332 to the second transmission input shaft 324 to gear 342. Gear 342 transfers torque to gear 344 which transfers the torque to the first countershaft 328, from the first countershaft 328 to gear 374 through synchronizer 399B, from gear 374 to gear 372, and from gear 372 to the output shaft member 314, and from the output shaft member 314 to differential housing 317 of final drive assembly 316.

To establish a third forward torque ratio (i.e. a 3rd gear), clutch element 336 is engaged to couple the input member 312 with the first transmission input shaft 322 and synchronizer 399D is activated to couple gear 386 to the second countershaft 330. More specifically, input torque from the input member 312 is transferred through the dual clutch assembly 332 to the first transmission input shaft 322 to gear 352. Gear 352 transfers torque to gear 354 which transfers the torque to the second countershaft 330, from the second countershaft 330 to gear 386 through synchronizer 399D, from gear 386 to gear 382, and from gear 382 to the output shaft member 314, and from the output shaft member 314 to differential housing 317 of final drive assembly 316.

To establish a fourth forward torque ratio (i.e. a 4th gear), clutch element 338 is engaged to couple the input member 312 with the first transmission input shaft 324 and synchronizer 399B is activated to couple gear 384 to the first countershaft 328. More specifically, input torque from the input member 312 is transferred through the dual clutch assembly 332 to the second transmission input shaft 324 to gear 342. Gear 342 transfers torque to gear 344 which transfers the torque to the first countershaft 328, from the first countershaft 328 to gear 384 through synchronizer 399B, from gear 384 to gear 382, and from gear 382 to the output shaft member 314, and from the output shaft member 314 to differential housing 317 of final drive assembly 316.

To establish a fifth forward torque ratio (i.e. a 5th gear), clutch element 336 is engaged to couple the input member 312 with the first transmission input shaft 322 and synchronizer 399E is activated to couple gear 406 to the second countershaft 330. More specifically, input torque from the input member 312 is transferred through the dual clutch assembly 332 to the first transmission input shaft 322 to gear 352. Gear 352 transfers torque to gear 354 which transfers the torque to the second countershaft 330, from the second countershaft 330 to gear 406 through synchronizer 399E, from gear 406 to gear 402, and from gear 402 to the output shaft member 314, and from the output shaft member 314 to differential housing 317 of final drive assembly 316.

To establish a sixth forward torque ratio (i.e. a 6th gear), clutch element 338 is engaged to couple the input member 312 with the first transmission input shaft 324 and synchronizer 399C is activated to couple gear 404 to the first countershaft 328. More specifically, input torque from the input member 312 is transferred through the dual clutch assembly 332 to the second transmission input shaft 324 to gear 342. Gear 342 transfers torque to gear 344 which transfers the torque to the first countershaft 328, from first countershaft 328 to gear 404 through synchronizer 399C, from gear 404 to gear 402, and from gear 402 to the output shaft member 314, and from the output shaft member 314 to differential housing 317 of final drive assembly 316.

To establish a seventh forward torque ratio (i.e. a 7th gear), clutch element 336 is engaged to couple the input member 312 with the first transmission input shaft 322 and synchronizer 399E is activated to couple gear 396 to the second countershaft 330. More specifically, input torque from the input member 312 is transferred through the dual clutch assembly 332 to the first transmission input shaft 322 to gear 352. Gear 352 transfers torque to gear 354 which transfers the torque to the second countershaft 330, from the second countershaft 330 to gear 396 through synchronizer 399E, from gear 396 to gear 392, and from gear 392 to the output shaft member 314, and from the output shaft member 314 to differential housing 317 of final drive assembly 316.

To establish a eighth forward torque ratio (i.e. a 8th gear), clutch element 338 is engaged to couple the input member 312 with the first transmission input shaft 324 and synchronizer 399C is activated to couple gear 394 to the first countershaft 328. More specifically, input torque from the input member 312 is transferred through the dual clutch assembly 332 to the second transmission input shaft 324 to gear 342. Gear 342 transfers torque to gear 344 which transfers the torque to the first countershaft 328, from the first countershaft 328 to gear 394 through synchronizer 399C, from gear 394 to gear 392, and from gear 392 to the output shaft member 314, and from the output shaft member 314 to differential housing 317 of final drive assembly 316.

Again, it should be appreciated that any one of the gear sets 340, 350, 360, 370, 380, 390, and 400 may be changed to produce a certain forward and reverse torque ratio without departing from the scope of the present invention.

The present invention contemplates that a variety of torque ratios (i.e., the ratio of torque of the output member 314 to the input member 312) are achievable through the selection of tooth counts of the gears of the transmission 310. This arrangement provides the opportunity to achieve reduced transmission length in comparison with other transmissions.

While the best modes for carrying out the invention have been described in detail, those familiar with the art to which this invention relates will recognize various alternative designs and examples for practicing the invention within the scope of the appended claims.

The following is claimed:
1. A transmission comprising:
a transmission housing;

a dual clutch assembly having a clutch housing connectable to a flywheel of an engine, wherein the clutch housing is rotationally supported within the transmission housing;

a first, second, third, fourth, fifth, sixth, and seventh gear sets, wherein each of the gear sets include a first gear in mesh with a second gear;

a first transmission input shaft member rotatably supported in the transmission housing and wherein the first gear of the first gear set is rotatably fixed for common rotation with the first transmission input shaft member;

a second transmission input shaft member rotatably supported in the transmission housing, wherein the first gear of the second gear set is rotatably fixed for common rotation with one of the first and second transmission input shaft members and wherein the second transmission input shaft member is concentric with the first transmission input shaft member and at least partially surrounds the first transmission input shaft member;

a first countershaft rotatably supported within the transmission housing and spaced apart from and parallel with the first and second transmission input shaft members, wherein each of the second gears of the third, sixth and seventh gear sets are selectively connectable for common rotation with the first countershaft;

a second countershaft rotatably supported within the transmission housing and spaced apart from and parallel with the first and second transmission input shaft members, wherein each of the second gears of the fourth and fifth gear sets are selectively connectable for common rotation with the second countershaft; and five synchronizer assemblies each for selectively coupling at least one of the gears of the gear sets with at least one of the first countershaft and the second countershaft, and wherein the selective engagement of the dual clutch assembly interconnects the dual clutch housing with at least one of the first and the second transmission input shaft members and the selective engagement of at least one of the five synchronizer assemblies establishes at least one of five forward speed ratios.

2. The transmission of claim 1 wherein the sixth gear set further includes a third gear meshing with the first gear of the sixth gear set, the third gear is selectively connectable for common rotation with the second countershaft.

3. The transmission of claim 2 wherein a first of the five synchronizer assemblies selectively connects the second gear of the third gear set to the first countershaft.

4. The transmission of claim 3 wherein a second of the five synchronizer assemblies selectively connects the second gear of the sixth and seventh gear sets to the first countershaft.

5. The transmission of claim 4 wherein a third of the five synchronizer assemblies selectively connects the second gear of the fourth gear set to the second countershaft.

6. The transmission of claim 5 wherein the first gear set is adjacent the dual clutch assembly, the second gear set is adjacent the first gear set, the third gear set is adjacent the second gear set, the fourth gear set is adjacent the third gear set, the fifth gear set is adjacent the fourth gear set, the sixth gear set is adjacent the fifth gear set, and the seventh gear set is between an end wall of the transmission housing and the sixth gear set.

7. The transmission of claim 6 wherein the first gear set further includes a third gear in mesh with the second gear of the first gear set.

8. The transmission of claim 7 wherein the third of the five synchronizer assemblies further selectively connects the third gear of the first gear set to the second countershaft.

9. The transmission of claim 8 wherein the fourth of the five synchronizer assemblies selectively connects the second gear of the first and second gear sets to the first countershaft.

10. The transmission of claim 9 wherein the fifth of the five synchronizer assemblies selectively connects the second gear of the fifth gear set and the third gear of the sixth gear set to the second countershaft.

11. The transmission of claim 6 wherein the first gear of the second gear set is rotatably fixed for common rotation with the second transmission input shaft member, the second gear of the first gear set is rotatably fixed to the first countershaft, the second gear of the second gear set is rotatably fixed to the second countershaft, the third, fourth, fifth and seventh gear sets further include a third gear, the third gear of the third gear set is in mesh with the first gear and the second gear of the third gear set, the third gear of the fourth and fifth gear sets are selectively connectable for common rotation with the first countershaft, and the third gear of the seventh gear set is selectively connectable for common rotation with the second countershaft.

12. The transmission of claim 11 further including an output member axially aligned with the first and second transmission input shafts, wherein the first gear of the third, fourth, fifth, sixth and seventh gear sets are rotatably fixed to the output member.

13. The transmission of claim 12 wherein the third of the five synchronizer assemblies further selectively connects the second gear of the fifth gear set to the second countershaft.

14. The transmission of claim 13 wherein the fourth of the five synchronizer assemblies selectively connects the third gear of the fourth and fifth gear sets to the first countershaft.

15. The transmission of claim 14 wherein the fifth of the five synchronizer assemblies selectively connects the third gear of the sixth and seventh gear sets to the second countershaft.

16. The transmission of claim 1 wherein the third gear set provides a reverse speed ratio, the fourth gear set provides a first and a second forward speed ratios, the fifth gear set provides a third and a fourth speed ratios, the sixth gear set provides a seventh and an eighth forward speed ratios, and the seventh gear set provides a fifth and a sixth forward speed ratio.

17. The transmission of claim 1 wherein the first gear set provides a second forward speed ratio and a reverse speed ratio, the second gear set provides a sixth forward speed ratio, the third gear set provides a fourth speed ratio, the fourth gear set provides an eighth forward speed ratio, the fifth gear set provides a seventh forward speed ratio, the sixth gear set provides a third and fifth forward speed ratio, and the seventh gear set provides a first forward speed ratio.

18. The transmission of claim 1 further including a first transfer gear, second transfer gear and an output gear, wherein the first transfer gear is rotatably fixed to the first countershaft, the second transfer gear is rotatably fixed to the second countershaft and each transfer gear is in mesh with the output gear.

19. A transmission comprising:
a transmission housing;
a dual clutch assembly having a clutch housing connectable to a flywheel of an engine, wherein the clutch housing is rotationally supported within the transmission housing;
a first, second, third, fourth, fifth, sixth, and seventh gear sets, wherein each of the gear sets include a first gear in mesh with a second gear;
a first transmission input shaft member rotatably supported in the transmission housing and wherein the first gear of the first gear set is rotatably fixed for common rotation with the first transmission input shaft member;

a second transmission input shaft member rotatably supported in the transmission housing, wherein the first gear of the second gear set is rotatably fixed for common rotation with one of one of the first and second transmission input shaft members and wherein the second transmission input shaft member is concentric with the first transmission input shaft member and at least partially surrounds the first transmission input shaft member;

a first countershaft rotatably supported within the transmission housing and spaced apart from and parallel with the first and second transmission input shaft members, wherein each of the second gears of the third, sixth and seventh gear sets are selectively connectable for common rotation with the first countershaft;

a second countershaft rotatably supported within the transmission housing and spaced apart from and parallel with the first and second transmission input shaft members, wherein each of the second gears of the fourth and fifth gear sets are selectively connectable for common rotation with the second countershaft;

a first synchronizer assembly selectively connecting the second gear of the third gear set to the first countershaft;

a second synchronizer assembly selectively connecting the second gear of the sixth and seventh gear sets to the first countershaft;

a third synchronizer assembly selectively connecting the second gear of the fourth gear set to the second countershaft; and a fourth synchronizer assembly for selectively coupling one of the second gears of the first and second gear sets with the first countershaft;

a fifth synchronizer assembly for selectively coupling the second gear of the fifth gear set with the second countershaft, and wherein the selective engagement of the dual clutch assembly interconnects the dual clutch housing with at least one of the first and the second transmission input shaft members and the selective engagement of at least one of the five synchronizer assemblies establishes at least one of five forward speed ratios.

20. The transmission of claim 19 wherein the sixth gear set further includes a third gear meshing with the first gear of the sixth gear set, the third gear is selectively connectable for common rotation with the second countershaft.

21. The transmission of claim 20 wherein the first gear set is adjacent the dual clutch assembly, the second gear set is adjacent the first gear set, the third gear set is adjacent the second gear set, the fourth gear set is adjacent the third gear set, the fifth gear set is adjacent the fourth gear set, the sixth gear set is adjacent the fifth gear set, and the seventh gear set is between an end wall of the transmission housing and the sixth gear set.

22. The transmission of claim 21 wherein the first gear set further includes a third gear in mesh with the second gear of the first gear set.

23. The transmission of claim 22 wherein the third of the five synchronizer assemblies further selectively connects the third gear of the first gear set to the second countershaft.

24. The transmission of claim 23 wherein the fourth of the five synchronizer assemblies selectively connects the second gear of the first and second gear sets to the first countershaft.

25. The transmission of claim 24 wherein the fifth of the five synchronizer assemblies selectively connects the second gear of the fifth gear set and the third gear of the sixth gear set to the second countershaft.

26. The transmission of claim 21 wherein the first gear of the second gear set is rotatably fixed for common rotation with the second transmission input shaft member, the second gear of the first gear set is rotatably fixed to the first countershaft, the second gear of the second gear set is rotatably fixed to the second countershaft, the third, fourth, fifth and seventh gear sets further include a third gear, the third gear of the third gear set is in mesh with the first gear and the second gear of the third gear set, the third gear of the fourth and fifth gear sets are selectively connectable for common rotation with the first countershaft, and the third gear of the seventh gear set is selectively connectable for common rotation with the second countershaft.

27. The transmission of claim 26 further including an output member axially aligned with the first and second transmission input shafts, wherein the first gear of the third, fourth, fifth, sixth and seventh gear sets are rotatably fixed to the output member.

28. The transmission of claim 27 wherein the third of the five synchronizer assemblies further selectively connects the second gear of the fifth gear set to the second countershaft.

29. The transmission of claim 28 wherein the fourth of the five synchronizer assemblies selectively connects the third gear of the fourth and fifth gear sets to the first countershaft.

30. The transmission of claim 29 wherein the fifth of the five synchronizer assemblies selectively connects the third gear of the sixth and seventh gear sets to the second countershaft.

31. The transmission of claim 30 wherein the third gear set provides a reverse speed ratio, the fourth gear set provides a first and a second forward speed ratios, the fifth gear set provides a third and a fourth speed ratios, the sixth gear set provides a seventh and an eighth forward speed ratios, and the seventh gear set provides a fifth and a sixth forward speed ratio.

32. The transmission of claim 19 wherein the first gear set provides a second forward speed ratio and a reverse speed ratio, the second gear set provides a sixth forward speed ratio, the third gear set provides a fourth speed ratio, the fourth gear set provides an eighth forward speed ratio, the fifth gear set provides a seventh forward speed ratio, the sixth gear set provides a third and fifth forward speed ratio, and the seventh gear set provides a first forward speed ratio.

33. The transmission of claim 32 further including a first transfer gear, second transfer gear and an output gear, wherein the first transfer gear is rotatably fixed to the first countershaft, the second transfer gear is rotatably fixed to the second countershaft and each transfer gear is in mesh with the output gear.

* * * * *